United States Patent [19]

Silverthorn

[11] Patent Number: 4,714,486
[45] Date of Patent: Dec. 22, 1987

[54] AUTOMATED PRODUCTION OF CANISTERS

[75] Inventor: Gideon C. Silverthorn, Kanata, Canada

[73] Assignee: Her Majesty the Queen in right of Canada, Ottawa, Canada

[21] Appl. No.: 871,378

[22] Filed: Jun. 6, 1986

[30] Foreign Application Priority Data

Jul. 3, 1985 [CA] Canada .................................. 486234

[51] Int. Cl.[4] ............................................ B01D 50/00
[52] U.S. Cl. ........................................ 55/316; 55/387;
55/502; 55/521; 55/DIG. 35; 128/205.28;
128/205.29; 128/206.17; 29/163.5 F; 156/307.7
[58] Field of Search ................. 55/316, 387, 512, 502,
55/DIG. 35, 521; 128/205.28, 205.29, 206.17;
29/163.5 F; 156/307.7

[56] References Cited

U.S. PATENT DOCUMENTS

| 2,577,606 | 12/1951 | Conley ................................ 55/512 |
| 2,825,424 | 3/1958 | Gross ................................... 55/316 |
| 3,944,403 | 3/1976 | Simpson et al. .............. 55/DIG. 35 |

FOREIGN PATENT DOCUMENTS

| 1800826 | 7/1969 | Fed. Rep. of Germany ........ 55/316 |
| 2007895 | 10/1970 | Fed. Rep. of Germany ........ 55/316 |

*Primary Examiner*—Bernard Nozick
*Attorney, Agent, or Firm*—Stevens, Davis, Miller & Mosher

[57] ABSTRACT

A filter canister for use with gas masks has telescoping top and bottom parts that are, in the assembled canister, sealed together. A filter for particulate material is molded in situ in the top part, while a separate adsorbent material cartridge is fitted into the bottom part. In manufacturing the canister, the cartridge is manufactured separately, apart from the remainder of the canister so that it can be kept in a controlled environment so as to avoid possible contaminating due to a humid atmosphere. The molding of the filter for particulate materials normally a pleated paper filter, in situ and away from the cartridge avoids the requirement for a long adhesive drying time during which the adsorbent material in the cartridge is exposed to humidity. The new canister also exhibits greater strength than the known canisters.

9 Claims, 4 Drawing Figures

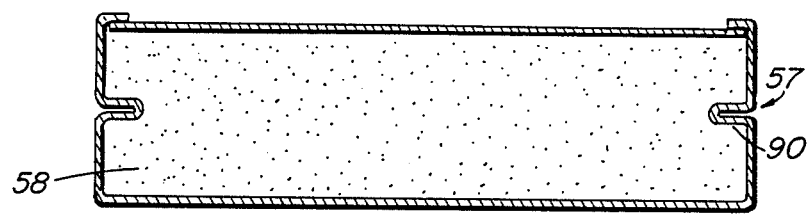
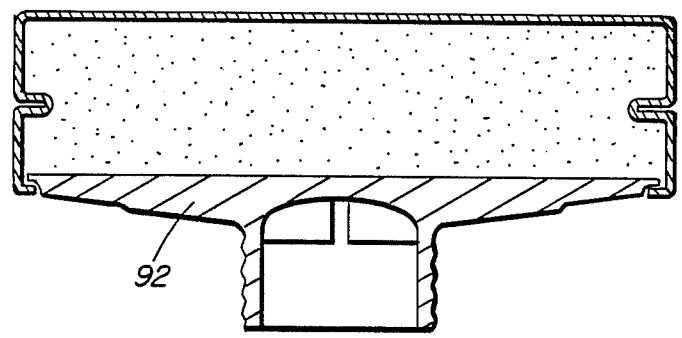

AUTOMATED PRODUCTION OF CANISTERS

FIELD OF THE INVENTION

The present invention relates to canister and more particularly to canisters such as those used in gas masks for protection against toxic agents.

BACKGROUND

The known gas mask canisters are satisfactory in many respects, but are subject to certain manufacturing limitations. In the manufacture of the existing canisters an adsorbent material, normally charcoal, is deposited in a level bed in the bottom of a canister. Pressure is applied to the charcoal bed and a diaphragm is locked in place under pressure by rolling a groove in the canister body to keep pressure on the bed. A preformed filter for particulate materials and a top diaphragm are then placed over the charcoal bed, with an adhesive sealant around the outer edge. After four hours of exposure the adhesive is cured and a cover is mounted on the canister. The canister may then be sealed with a rubber plug pushed into the inlet opening in the cover and a screw cover fitted to the bottom outlet opening.

With this procedure, the charcoal is left exposed to ambient conditions in the assembly area for a considerable time (4 hours or more). This may lead to an excessive moisture content in the hydroscopic carbon. The assembly plant can be air conditioned to provide a very dry atmosphere, but this is expensive and causes discomfort to the workers in the area.

Other characteristics of the known canister that could be improved are resistance and damage in the prevention of air by-passing the charcoal bed by flowing down the outer wall of the canister around the bed.

The present invention is concerned with solutions to the various problems.

SUMMARY

According to one aspect of the present invention there is provided a filter canister for use on a gas mask, comprising a canister body with top and bottom parts sealed together, a filter for particulate material sealed into the top part and a separate adsorbent cartridge fitted into the bottom part of the body.

This aspect of the invention also provides a method of making the canister comprising manufacturing the cartridge, subsequently installing the cartridge in the bottom part of the canister body and installing the particulate filter in the top part of the body, and then assembling the body parts.

The manufacture of the canister body in two parts and the separate manufacture of an adsorbent cartridge enables a substantial reduction in the amount of time that the adsorbent material is exposed to ambient atmosphere in the assembly area. The cartridge may be assembled in a relatively small area of controlled environment, gas tested and retained in that environment until it is required for assembly to the other parts of the canister.

The particulate filter is preferably manufactured in situ in the top part of the canister body, thus eliminating the need for the separate mold that is now used and the additional adhesive for securing the formed filter in place. This also eliminates the four hour adhesive curing time during which the charcoal adsorbent is exposed to the ambient assembly area atmosphere. The new canister and method also lend themselves more fully to an automated assembly process than does the prior art canister.

The use of a separate cartridge for the adsorbent material provides a double wall in the completed assembly that improves resistance to damage from sharp dents. This may be enhanced by using a baffle support in the canister that screws into the threaded coupling on the bottom of the canister and engages the baffle of the cartridge. While baffle supports have been used in the past, they have not served to reinforce the threaded coupling.

To inhibit the bypassing of air around the outside of the charcoal bed, the cartridge is preferably equipped with an inner peripheral flange projecting into the adsorbent material. According to another aspect of the invention this may be formed by making the cartridge of a metal cup, scoring the wall of the cup and bending it inwards at the score line after filling with charcoal.

BRIEF DESCRIPTION OF THE DRAWINGS

In the accompanying drawings, which illustrate exemplary embodiments of the present invention:

FIG. 3 is a cross section of a cartridge that may be employed in a canister according to the present invention; and FIG. 4 is an alternative form of cartridge for use in a canister according to the present invention.

DETAILED DESCRIPTION

Figure 1:
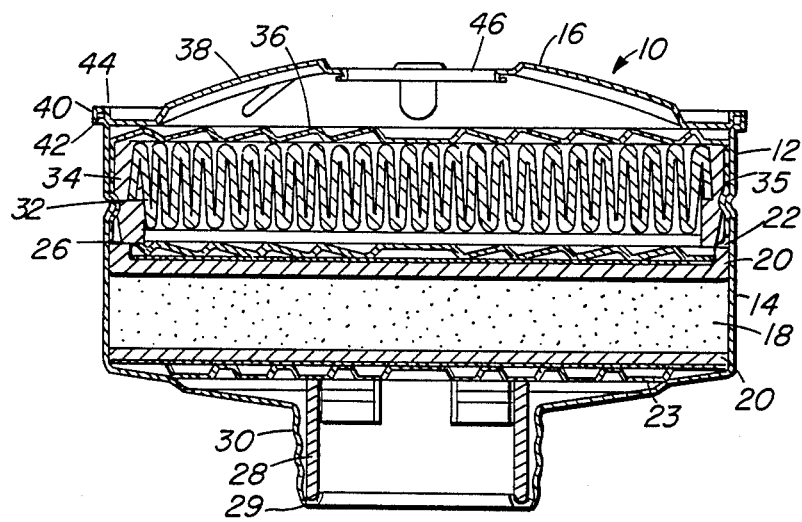
FIG. 1 is a cross section of a prior art canister.

Referring to the drawings, and particularly to FIG. 1, there is illustrated a prior art canister 10. This canister has a canister body consisting of a housing 14 and a cover 16. The housing 14 accommodates a bed of activated charcoal 18 sandwiched between layers of an appropriate retaining medium 20 that serves to confine the charcoal to its bed while permitting the passage of air through it.

Annularly corrugated diaphragms 22 and 23 are mounted on opposite sides of the charcoal bed. Diaphragm 22 is assembled with pressure on the bed of charcoal 18 then locked in place with a grooving wheel acting on the exterior wall of the canister. Deflection of the diaphragm 23 is resisted by an annular support sleeve 28 that extends from the bottom of the diaphragm 23 to a flange 29 on a threaded mounting coupling 30 of the canister housing 14.

Mounted in the canister above the charcoal bed is a pleated paper filter 32 surrounded by a polyurethane gasket 34. The gasket 34 is sealed to the inside wall of the container housing 14 by an adhesive seal 35. An annularly corrugated diaphragm 36 is mounted on the top of the filter 32. The canister housing is closed by a cover 38 joined to the side wall of the housing 14 by a chime 40 formed by a bead 42 on the upper edge of the housing wall and a mating channel 44 at the rim of the cover 38. The center of the cover has a circular opening 46 to provide for the passage of air to be purified into the canister.

The canister illustrated in FIG. 1 is subject to certain disadvantages. Because the charcoal bed 18 is installed in the housing 14 as one of the first steps in assembly, and because it takes roughly four hours to cure the adhesive joining the polyurethane gasket 34 of the pleated paper filter 32 to the housing 14, the charcoal is exposed to the ambient atmosphere in the assembly area for a lengthy time. Additionally, the canister is subject to damage*, particularly in the area of the charcoal bed, the thread 30 and the cover 38.

* The damage referred to here is *not* during production but by the operation when in use.

One additional problem that arises with the known canister is the possibility that air could bypass the charcoal bed 18 along the inside of the canister wall.

Figure 2:
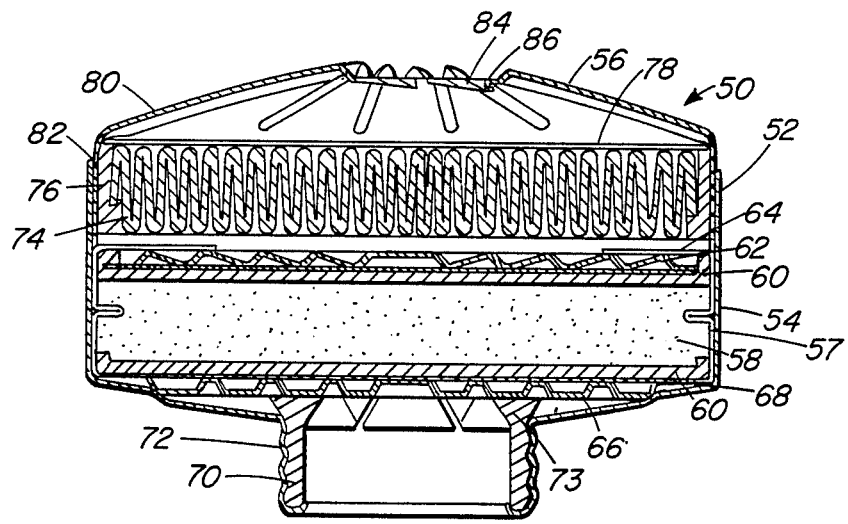
FIG. 2 is a similar cross section of a canister according to the present invention.

A new canister design that addresses the above problems is illustrated in FIG. 2. The canister 50 illustrated in FIG. 2 has a canister body 52 made up of a lower body part 54 and an upper part 56 that incorporates the cover. The upper part telescopes into the lower part to form the complete container housing and is sealed with an adhesive sealant.

The bottom part 54 of the canister housing accommodates a cartridge 57 that is, in effect, a cup like container enclosing a bed of charcoal 58 sandwiched between two layers 60 of an appropriate retaining material analogous to the layers 20 in the canister of FIG. 1. The upper layer 60 is covered by an annularly corrugated diaphragm 62. The top edge of the container is folded over at 64 to retain the contents of the cartridge in place. The cartridge is inserted in the canister on top of a diaphragm 66 and is sealed in place by an adhesive seal 68. The diaphragm 66 is supported by a sleeve 70 analogous to the sleeve 28 of FIG. 1 but threaded on its outer surface to screw into the threaded coupling 72 of the canister. The upper end of the supporting sleeve 70 is widened at 73 to provide extra support to the diaphragm 66.

The new canister also contains a pleated paper filter 74 that is sealed in place by a pheripheral polyurethane seal 76. This seal is spun in place using centrifugal force. The pleated filter is surmounted by a plastic diaphragm 78. The cover 80 of the upper portion of the canister has a depending wall 82 that slides into the upper portion of the wall of the canister lower portion 54 and is secured to the lower portion by an adhesive sealant. At the top, the central opening of the canister is formed with a rolled thread 84 and surrounded by a flat area 86. This provides a seat for a threaded plug that is used to seal this opening closed for storage.

The cartridge 57 is illustrated in FIG. 3. As shown in that drawing, the cartridge has an overall cup-shape with the wall formed into an inwardly projecting peripheral flange 90 midway between the bottom and top of the cartridge. This flange is produced by scoring the wall and providing an initial bend before the cartridge is filled with charcoal and the closing diaphragm. The diaphragm is then pressed against the charcoal and pressure is applied to the wall to collapse it to form the desired flange. The upper edge of the wall is then rolled over the edge of the diaphragm.

FIG. 4 of the drawings illustrates another embodiment of the cartridge, where the diaphragm is joined to the bottom of the cartridge and is a combined diaphragm and diaphragm support baffle 92.

I claim:

1. In a filter canister for use on a gas mask comprising a body with an inlet and an outlet, a filter for particulate material and an absorbent material filter arranged in the body in sequence between the inlet and outlet, the improvement comprising:
    a body including a rigid, cup-shaped top part with the inlet and a rigid, cup-shaped bottom part with the outlet, the two parts having respective cylindrical side walls engaged telescopically with one another and being sealed together with an adhesive sealant;
    a filter for particulate material sealed into the top part; and
    an absorbent filter comprising a separate cartridge with a bed of absorbent material housed in a rigid, cylindrical wall, the cartridge being fitted into the bottom part and sealed therein, whereby a double wall of rigid material is provided around the absorbent material bed.

2. A filter according to claim 1, wherein the filter for particulate material comprises a filter and a settable sealant material surrounding the filter and sealing the filter into the top part of the canister.

3. A canister according to claim 1, wherein the cartridge has an internal peripheral flange projecting from the side wall into the adsorbent material at a position spaced from the top and, bottom faces of the cartridge, whereby the side wall of the cartridge is stiffened and gas passages along the side wall are intercepted.

4. A filter canister according to claim 1, including a baffle defining a bottom face of the cartridge, a threaded sleeve for mounting the bottom of the canister to a mask connector and a threaded support sleeve screwed into the mounting sleeve and engaging the baffle so as to support the baffle and the mounting sleeve against deformation.

5. A canister according to claim 4, wherein the threaded support sleeve is integral with the cartridge baffle.

6. A method of making a filter canister for use in a gas mask comprising:
    manufacturing an adsorbent material filter cartridge which includes an outer wall;
    providing a canister body having a top part with an inlet and a bottom part with an outlet;
    sealing a filter for particulate materials into the top part of the canister body by spinning the top part of the canister body with the filter for particulate materials and a settable sealant therein and allowing the sealant to set while continuing to spin the top part of the canister body;
    installing the cartridge in the bottom part of the canister body; and
    assembling the top and bottom body parts to provide a filter canister with the filter for particulate materials and the adsorbent material filter in sequence between the inlet and outlet.

7. A method of making a filter canister for use in a gas mask comprising:
    manufacturing an adsorbent material filter cartridge which includes an outer wall in a controlled atmosphere substantially free of contaminants;
    providing a canister body having a top part with an inlet and a bottom part with an outlet;
    sealing a filter for particulate materials into the top part of the canister body outside of said controlled atmosphere;
    installing the cartridge in the bottom part of the canister body; and
    assembling the top and bottom body parts to provide a filter canister with the filter for particulate materials and the adsorbent material filter in sequence between the inlet and outlet.

8. A method according to claim 7, including gas testing the cartridge before its installation in the canister body.

9. A method according to claim 7, comprising manufacturing the particulate filter in situ in the top body part.

* * * * *